(12) United States Patent
Mao-Sung

(10) Patent No.: US 6,727,897 B1
(45) Date of Patent: Apr. 27, 2004

(54) SELECTOR PEN FOR TOUCH SCREEN

(75) Inventor: Wu Mao-Sung, Taoyuan (TW)

(73) Assignee: Senton Enterprise Co., Ltd., Pa Te (TW)

( * ) Notice: Subject to any disclaimer, the term of this patent is extended or adjusted under 35 U.S.C. 154(b) by 279 days.

(21) Appl. No.: 10/054,991

(22) Filed: Jan. 25, 2002

(51) Int. Cl.[7] .................................................. G09G 5/00
(52) U.S. Cl. ..................................... 345/179; 178/19.01
(58) Field of Search ...................... 178/19.01; 345/179; 382/313, 314; 401/45, 195

(56) References Cited

U.S. PATENT DOCUMENTS 5,405,208 A * 4/1995 Hsieh .......................... 401/195
5,470,164 A * 11/1995 Chen .......................... 401/195
6,550,997 B1 * 4/2003 King et al. .................... 401/45
2003/0053840 A1 * 3/2003 Lapstun et al. ................ 401/45

* cited by examiner

Primary Examiner—Richard Hjerpe
Assistant Examiner—Shaima Aminzay

(57) ABSTRACT

A selector pen for touch screen includes a barrel having a light emitter mounted therein to be turned on or off through turning of a switch rotatably connected to a rear end of the barrel. The switch includes a base defining a non-circular insertion hole, a movable rod being fixedly received in the insertion hole of the movable rod and having an inclined top formed into a spiral guide surface, and a cap being rotatably covered onto the base and having an internal projection. When the cap is turned, the projection slides along the spiral guide surface to gradually depress the movable rod for the same to electrically make the light emitter. The switch has simplified structure and the spiral guide surface defines a definite range of turning for the cap.

3 Claims, 6 Drawing Sheets

SELECTOR PEN FOR TOUCH SCREEN

BACKGROUND OF THE INVENTION

The present invention relates to a selector pen, and more particularly to a selector pen for touch screen that has a structurally simplified switch and could be manufactured at lowered cost.

With the highly advanced computer technology, various kinds of electronic products have been developed to have compact volume and increased functions. For example, there are many applied electronic products having key-controlled functions directly provided on a screen thereof. The screen is provided with a sensing membrane via which user's instructions are entered. Such screen is referred to as a touch screen and was originally developed for big-size screens for general computers but has currently been employed on small-size liquid crystal display (LCD) for electronic dictionary, personal digital assistant (PDA), etc. To enter instructions or to select options on the touch screen, a selector pen (that is, a light pen) is usually needed to touch the screen, though the instructions and the selections may also be entered by handwriting.

FIG. 1 is an exploded perspective view of a conventional selector pen 10. As shown, the selector pen 10 mainly includes a barrel 1, a transparent head 2, a light-emitting means 3, and a switch 4.

The barrel 1 is a hollow tube with the transparent head 2 fixedly connected to a front end thereof and the light-emitting means 3 mounted therein. A rear end of the barrel 1 is provided with an internal screw thread 11 for the switch 4 to screw thereinto.

The transparent head 2 is a substantially conic body having a blunt front point 21 and allows light emitted from the light-emitting means 3 inside the barrel 1 to pass therethrough.

The light-emitting means 3 includes a circuit board 31 having a light emitter 32, which is preferably a light emitting diode, connected thereto; a big spring 33 connected to a positive electrode of a power input of the circuit board 31; a small spring 34 connected to a negative electrode and located at a center in the big spring 33; and a battery 35 having a front outer peripheral surface forming a positive electrode to contact with the big spring 33 and a bar-shaped negative electrode forward projected from a center of the positive electrode to extend into the big spring 33 for contacting with the small spring 34. When a special light emitting diode is used, such as a white light emitting diode that needs a voltage higher than that for general light emitting diodes, the circuit board 31 is additionally provided with a voltage booster circuit 36, so that the voltage rises from low to high voltage to provide the special light emitting diode with normal working voltage.

The switch 4 includes a fixing seat 41, a movable rod 42, and a cap 43. The fixing seat 41 is a hollow tube generally divided into a lower half and an upper half. An upper outer periphery of the lower half is provided with a collar 411 having an outer diameter corresponding to that of the barrel 1, and a lower outer periphery of the lower half below the collar 411 is provided with an external screw thread 412 for engaging with the internal screw thread 11 of the barrel 1. The upper half of the fixing seat 41 is provided at an inner upper end with an internal screw thread 413. The movable rod 42 is provided around a lower portion of an upper half with an external screw thread 421 corresponding to the internal screw thread 413 of the fixing seat 41, immediately above the external screw thread 421 with a diameter-reduced gear 422, and above the gear 422 with a shaft 423. The cap 43 has an open lower end communicable with a stepped internal space defined by the cap 43. The stepped internal space of the cap 43 includes a first recess 431 most close to the open lower end for receiving the fixing seat 41 and the movable rod 42, a second recess behind the first recess for receiving the gear 432, and a third recess behind the second recess for receiving the shaft 433. The movable rod 42 is rotatably, upward and downward movably mounted in the fixing seat 41 through engagement of the external screw thread 421 with the internal screw thread 413.

When the light-emitting means 3 is mounted in the barrel 1, the light emitter 32 is caused to face forward and contact with the transparent head 2, and the big and the small springs 33, 34 are located behind the light emitter 32 to correspond to the positive and the negative electrodes, respectively, of the battery 35. Due to a spring force applied by the big spring 33 on the battery 35 to push the latter backward, the small spring 34 is normally prevented from electrically contacting with the bar-shaped negative electrode of the battery 35. And, the switch 4 is connected to the barrel 1 by screwing the fixing seat 41 to the rear end of the barrel 1 with a front-end surface of the movable rod 42 normally pressed against a rear-end surface of the battery 35. FIG. 2 is a sectional view of the assembled selector pen 10, wherein the light-emitting means 3 is not electrically made to emit light.

For the selector pen 10 to emit light, simply turn the cap 43 in a predetermined direction, so that the gear 422 received in the second recess 432 of the cap 43 is brought to rotate. At this point, the external screw thread 421 of the movable rod 42 is guided by the internal screw thread 413 of the fixing seat 41 to move forward, bringing the movable rod 42 to push against the battery 35 and accordingly compress the big spring 33. At this point, the bar-shaped negative electrode of the battery 35 is gradually moved forward to eventually contact the small spring 34 to make the light emitter 32 for the latter to emit light, as shown in FIG. 3. When the cap 43 is turned reversely, the movable rod 42 is brought to move backward and the light emitter 32 is turned off, accordingly, as shown in FIG. 2.

The above-described conventional selector pen 10 has the following disadvantages in its structure and operation:

1. The cap 43 includes a stepped internal space providing three recesses of different inner diameters. The middle one of the three recesses is configured to receive the gear 422, making it difficult and time-consuming to manufacture components for the switch 4.

2. Due to the switch 4 that is difficult and time-consuming to manufacture, the selector pen 10 is produced at increased cost.

3. When the cap 43 is turned clockwise or counterclockwise relative to the barrel 1 to turn on or off the light-emitting means 3, the internal and the external screw threads 413 and 421, due to their very delicate structure and therefore insufficient supporting pressure, tend to slip relative to one another, causing the switch 4 to lose its intended control function.

4. The switch 4 is not designed with means for actually defining exact number of turns of the switch 4 in order to turn on or off the light-emitting means 3. When the cap 43 is overly turned, for example, when the battery 35 is exhausted, the screw threads 413 and 421 tend to slip relative to one another or even break.

It is therefore tried by the inventor to develop a selector pen that has improved but simplified switch structure to eliminate the above-mentioned disadvantages existing in the conventional selector pen.

SUMMARY OF THE INVENTION

A primary object of the present invention is to provide a selector pen for touch screen, on which a simplified switch is provided to turn on or off a light-emitting means mounted in a barrel of the selector pen, so that the selector pen could be manufactured at lowered cost and effectively emit light when necessary.

To achieve the above and other objects, the selector pen for touch screen of the present invention mainly includes a barrel, a transparent head connected to a front end of the barrel, a light-emitting means mounted in the barrel to emit light that passes through the transparent head to illuminate a dim environment near the touch screen, and a switch rotatably connected to a rear end of the barrel to turn on or off the light-emitting means. The switch includes a base defining a non-circular insertion hole, a movable rod being fixedly received in the insertion hole of the movable rod and having an inclined top formed into a spiral guide surface, and a cap being rotatably covered onto the base and having an internal projection. When the cap is turned, the projection slides along the spiral guide surface to gradually depress the movable rod for the same to electrically make the light-emitting means.

The switch has simplified structure to enable lowered manufacturing cost of the selector pen, and the spiral guide surface defines a definite range of turning for the cap to avoid the problem of insufficiently or overly turned switch.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
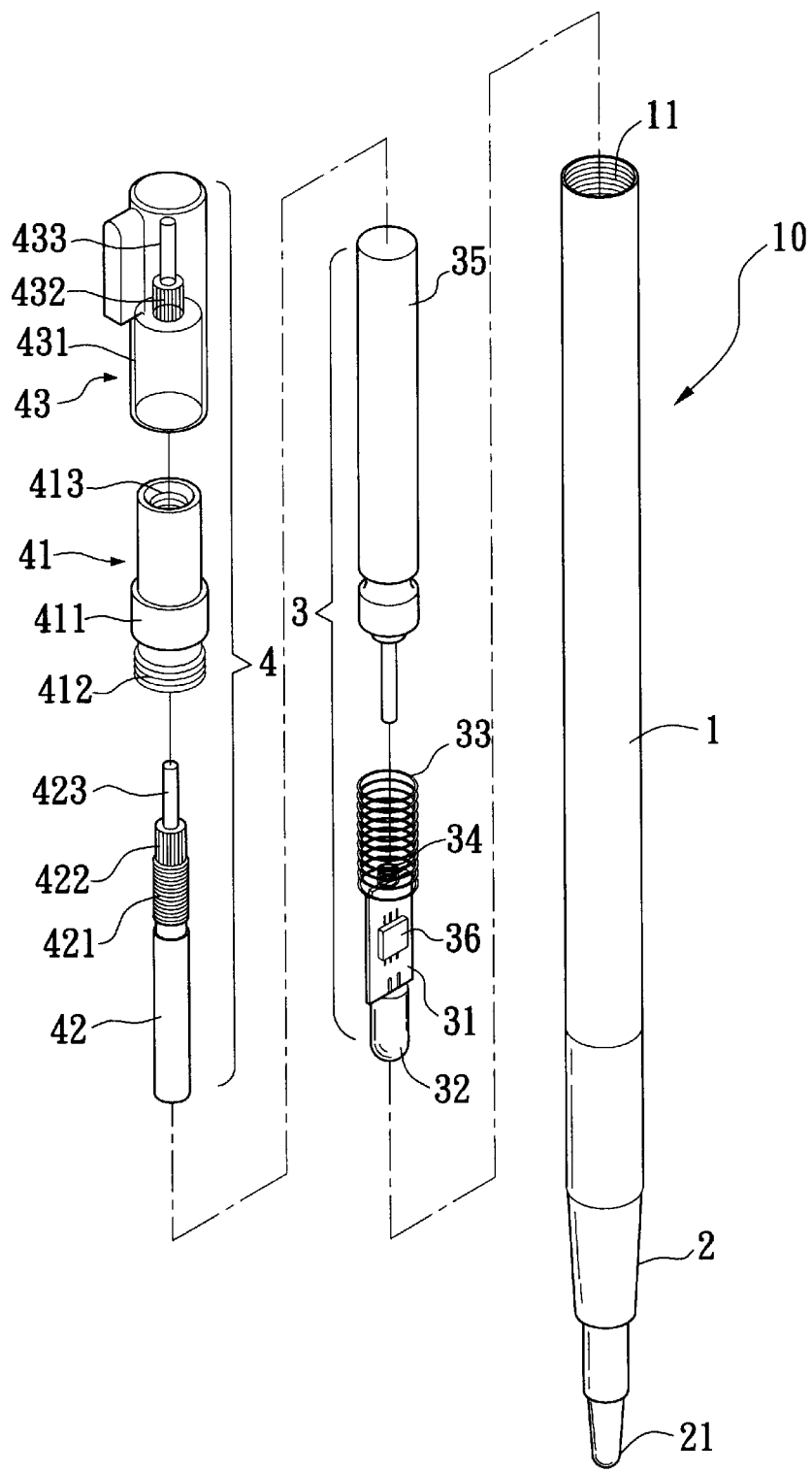
FIG. 1 is an exploded perspective view of a conventional selector pen.
Figure 2:
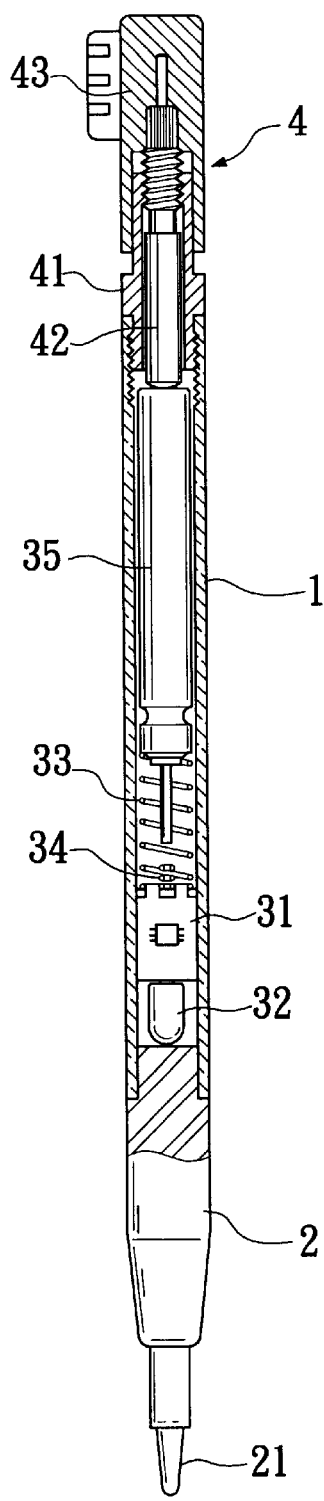
FIG. 2 is an assembled sectional view of the selector pen of FIG. 1 before being electrically made to emit light.
Figure 3:
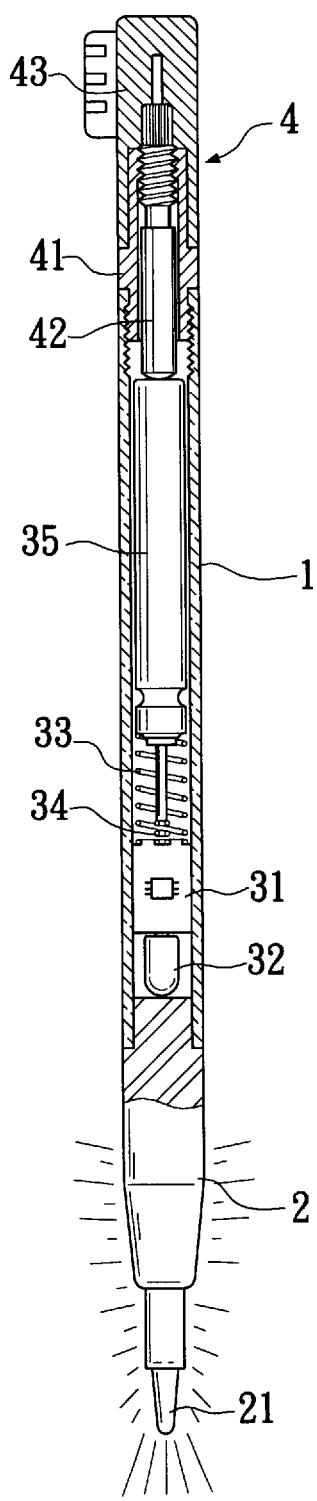
FIG. 3 is an assembled sectional view of the selector pen of FIG. 1 having been electrically made to emit light.
Figure 4:
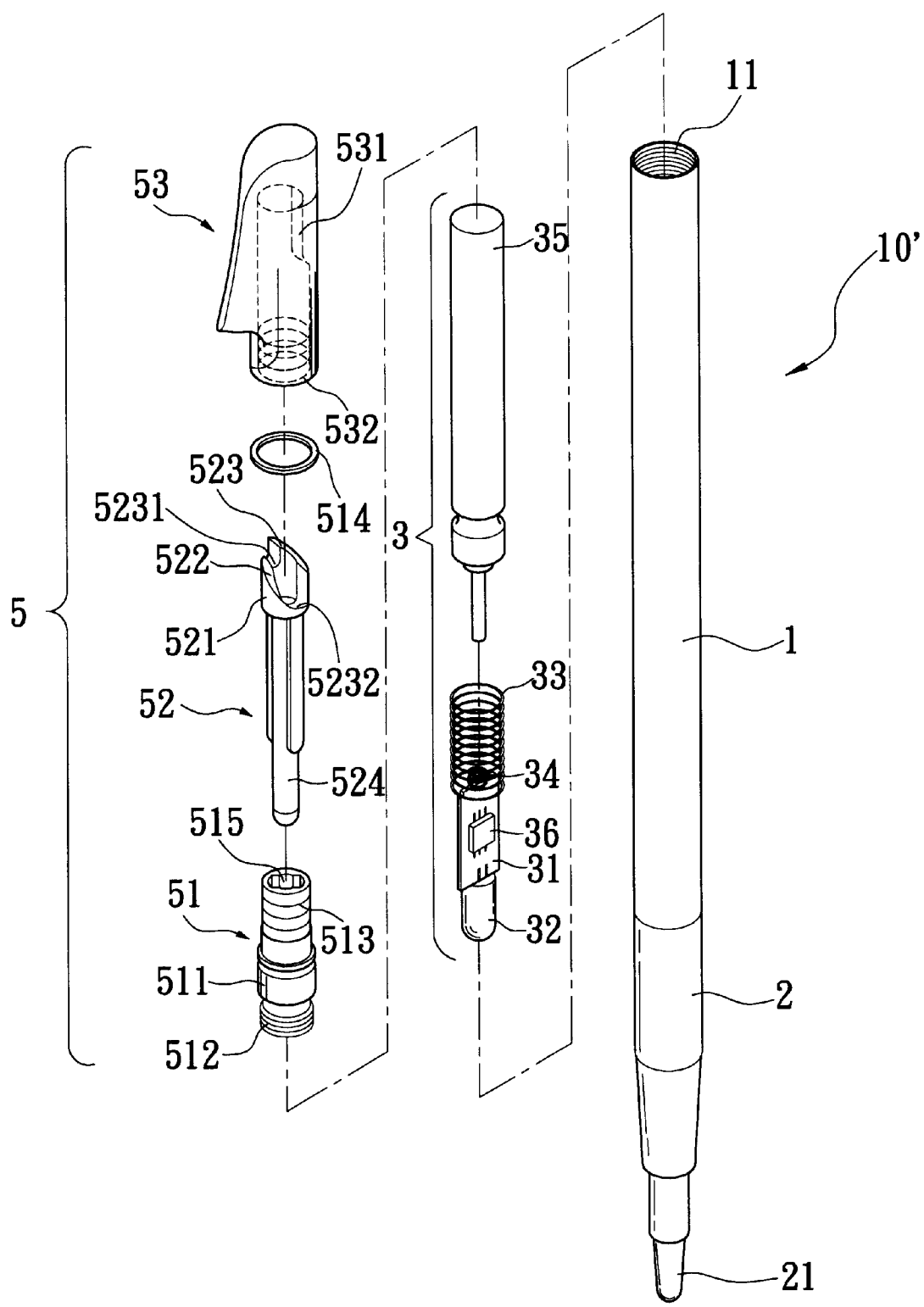
FIG. 4 is an exploded perspective view of a selector pen according to the present invention.

Please refer to FIG. 4 that is an exploded perspective view of a selector pen 10' according to the present invention. In the following description, similar reference numerals will be denoted to parts of the selector pen 10' that are the same as or similar to those of the conventional selector pen 10. As shown in FIG. 4, the selector 10' mainly includes a barrel 1, a transparent head 2, a light-emitting means 3, and a switch 5.

The barrel 1 is a hollow tube with the transparent head 2 fixedly connected to a front end thereof and the light-emitting means 3 mounted therein. A rear end of the barrel 1 is provided with an internal screw thread 11 for the switch 5 to screw thereinto.

The transparent head 2 is a substantially conic body having a blunt front point 21 and allows light emitted from the light-emitting means 3 inside the barrel 1 to pass therethrough.

The light-emitting means 3 includes a circuit board 31 having a light emitter 32, which is preferably a light emitting diode, connected thereto; a big spring 33 connected to a positive electrode of a power input of the circuit board 31; a small spring 34 connected to a negative electrode located at a center in the big spring 33; and a battery 35 having a front outer peripheral surface forming a positive electrode to contact with the big spring 33 and a bar-shaped negative electrode forward projected from a center of the positive electrode to extend into the big spring 33 for contacting with the small spring 34. When a special light emitting diode is used, such as a white light emitting diode that needs a voltage higher than that for general light emitting diodes, the circuit board 31 is additionally provided with a voltage booster circuit 36, so that the voltage rises from low to high voltage to provide the special light emitting diode with normal working voltage.

The switch 5 includes a base 51, a movable rod 52, and a cap 53.

The base 51 is a hollow tube being provided around a body thereof with a collar 511 that has an outer diameter corresponding to that of the barrel 1, around a lower outer periphery below the collar 511 with an external screw thread 512 for engaging with the internal screw thread 11 of the barrel 1, and around an upper outer periphery above the collar 511 with a plurality of radially protruded rings 513 for retaining the cap 53 to the base 51. A washer 514 may be put around the base 51 between the collar 511 and the rings 513. The base 51 defines a hollow insertion hole 515 that may be of any cross section except circular shape in order to prevent the movable rod 52 from moving in the hole 515 in circular motion.

The movable rod 52 includes a head portion 521 having an inclined top, and a long body portion 524 below the head portion 521. One half of the inclined top is cut to form from top to bottom into a spiral guide surface 522, and the other half of the inclined top is formed into a raised side stop 523. Upper and lower recesses 5231 and 5232 are provided at upper and lower ends, respectively, of an intersection line between the spiral guide surface 522 and the raised side stop 523. The long body portion 524 has a configuration corresponding to the insertion hole 515 defined in the base 51. When the long body portion 524 of the movable rod 52 is inserted into the non-circular insertion hole 515, the movable rod 52 is not allowed to move in circular motion but to move upward and downward relative to the base 51.

Figures 5, 5A:
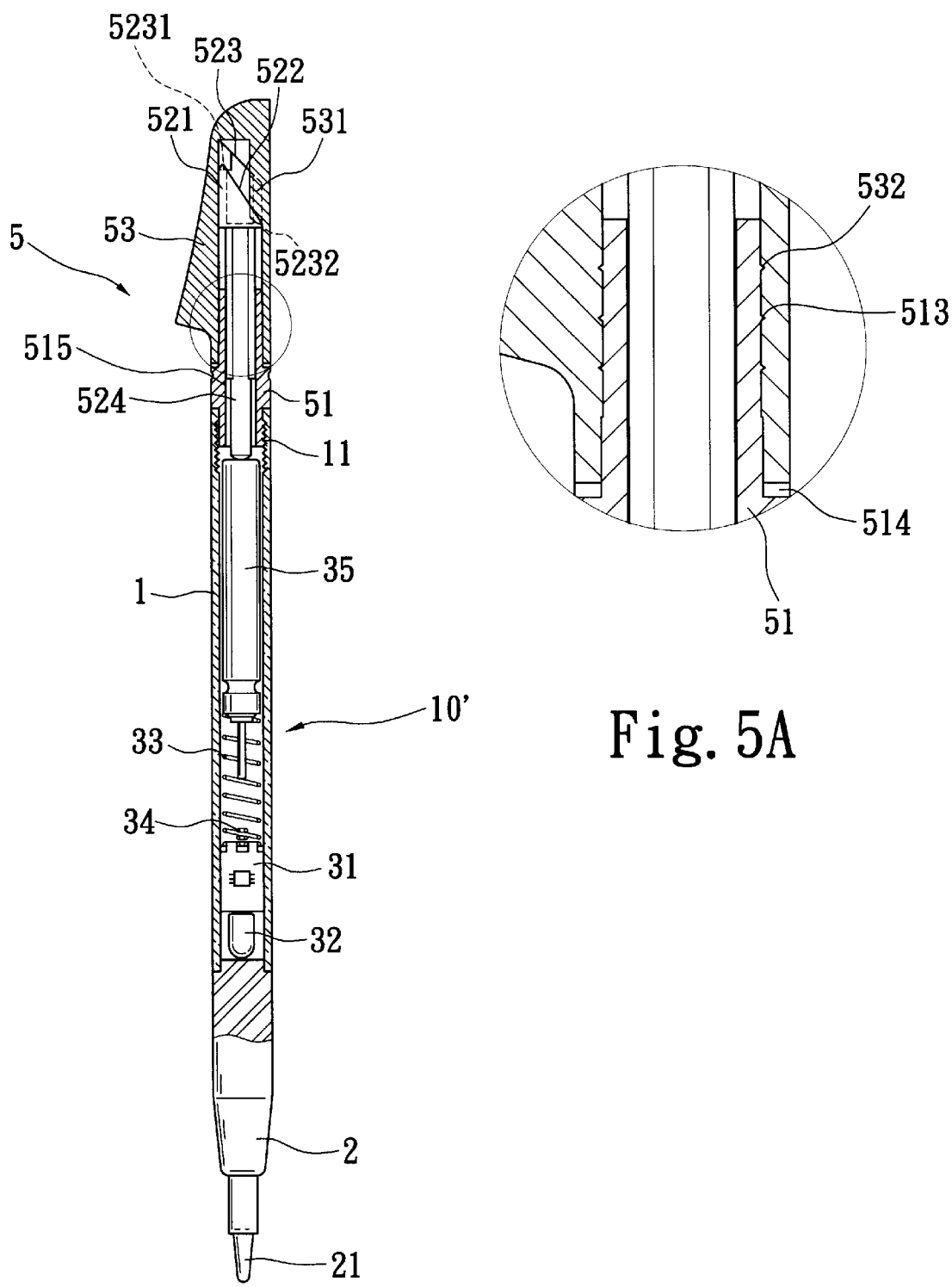
FIG. 5 is an assembled sectional view of the selector pen of FIG. 4 before being electrically made to emit light.
FIG. 5A is a partially enlarged view of FIG. 5.

The cap 53 is configured for rotatably covering onto the base 51. The cap 53 defines an inner space, in an upper half of which there is provided a radial projection 531, and in a lower half of which there is provided a plurality of annular grooves 532 adapted to rotatably engage with the protruded rings 513 on the base 51, as shown in FIG. 5A. When the cap 53 is rotated relative to the base 51, the projection 531 inside the cap 53 is brought to slide along the spiral guide surface 522 on the top of the movable rod 52 to finally engage with the upper recess 5231 or the lower recess 5232 at two ends of the spiral guide surface 522.

Please refer to FIG. 5. When the light-emitting means 3 is mounted in the barrel 1 with the light emitter 32 facing forward to contact with the transparent head 2, the big and the small springs 33, 34 are located behind the light emitter 32 to correspond to the positive and the negative electrodes, respectively, of the battery 35. Due to a spring force applied by the big spring 33 on the battery 35 to push the latter backward, the small spring 34 is normally prevented from electrically contacting with the bar-shaped negative electrode of the battery 35. The base 51 of the switch 5 is screwed to the rear end of the barrel 1 with a front end of the movable rod 52 normally contacting with a rear end surface of the battery 35. Since the battery 35 is normally supported on and pushed rearward by the big spring 34, the movable rod 52 behind the battery 35 is also pushed rearward by the big spring 34 at the same time. At this point, the lower recess 5232 at the lower end of the spiral guide surface 522 on the head portion 521 of the movable rod 52 is engaged with the projection 531 inside the cap 53, and the selector pen 10' is not electrically made to emit light.

Figure 6:
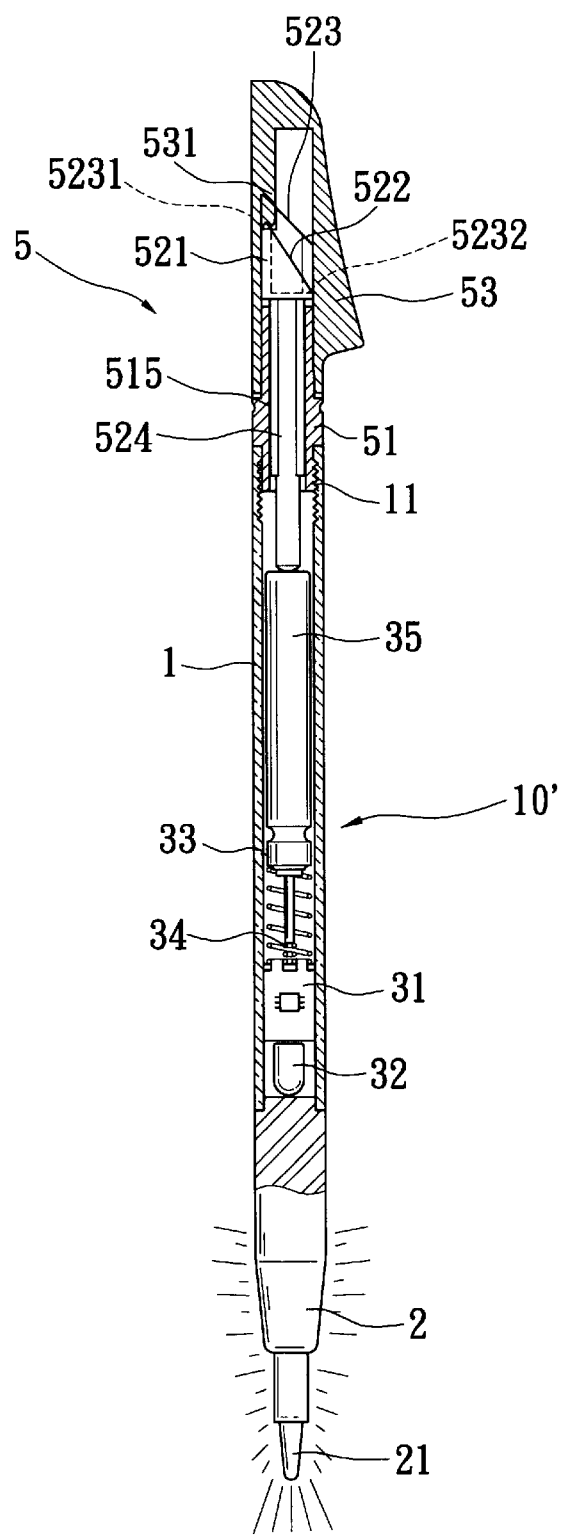
FIG. 6 is an assembled sectional view of the selector pen of FIG. 4 having been electrically made to emit light.

Please refer to FIG. 6. For the selector pen 10' to emit light, simply turn the cap 53 in a predetermined direction, for example, clockwise, so that the projection 531 inside the cap 53 is disengaged from the lower recess 5232 to move along the spiral guide surface 522 toward the upper recess 5231 when the cap 53 is continuously turned. At this point, the head portion 521 of the movable rod 52 is gradually depressed by the projection 531 of the cap 53 moving toward the upper recess 5231 to push the long body portion 524 against the battery 35 and accordingly compress the big spring 33. When the projection 531 in the cap 53 is finally moved into the upper end of the spiral guide surface 522 of the movable rod 52, it is stopped by the raised side stop 523 and falls into the upper recess 5231 to locate thereat. At this point, the battery 35 and the movable rod 52 are not pushed rearward by the spring force of the big and the small springs 33, 34, and the bar-shaped negative electrode of the battery 35 is in contact with the small spring 34 to electrically make the light emitter 32 for the latter to emit light, as shown in FIG. 6. And, when the cap 53 is turned reversely to disengage the projection 531 from the upper recess 5231, the battery 35 and the movable rod 52 are pushed rearward again by the big and the small springs 33, 34 to separate from the circuit board 31 and the light emitter 32 is turned off, accordingly, as shown in FIG. 5.

What is claimed is:

1. A selector pen for touch screen, comprising a barrel, a transparent head connected to a front end of said barrel, a light-emitting means mounted in said barrel behind said transparent head, a switch rotatably connected to a rear end of said barrel for turning said light-emitting means on and off; said switch including a base defining a hollow insertion hole therein, a movable rod received in said insertion hole of said base, and a cap rotatably covered onto said base;

said movable rod including a head portion having an inclined top, and a long body portion below said head portion; one half of said inclined top being cut to form from top to bottom into a spiral guide surface, and the other half of said inclined top being formed into a raised side stop; an upper and a lower recess being provided at upper and lower ends, respectively, of an intersection line between said spiral guide surface and said raised side stop; and said long body portion having a configuration corresponding to said insertion hole defined in said base for inserting into said insertion hole to only move upward and downward relative to said base but not rotate in said base; and said cap being configured for rotatably covering onto said base and defining an inner space, said inner space being provided in an upper half with a radial projection that is adapted to slide along said spiral guide surface on said inclined top of said movable rod to finally engage with said upper or said lower recess at two ends of said spiral guide surface when said cap is rotated relative to said base.

2. The selector pen for touch screen as claimed in claim 1, wherein said base of said switch is provided at predetermined positions with a plurality of radially protruded rings, and said cap of said switch is provided around said inner space at predetermined positions with a plurality of annular grooves corresponding to and adapted to engage with said radially protruded rings on said base.

3. The selector pen for touch screen as claimed in claim 1, wherein said hollow insertion hole defined in said base has a non-circular cross section.

* * * * *